US005896192A

United States Patent [19]

Nagase

[11] Patent Number: 5,896,192

[45] Date of Patent: Apr. 20, 1999

[54] APPARATUS FOR DISCRIMINATING BILLS WHICH HAVE A TRANSPARENT PORTION

[75] Inventor: Mitsuhiro Nagase, Tokyo, Japan

[73] Assignee: Laurel Bank Machines Co., Ltd., Tokyo, Japan

[21] Appl. No.: 08/837,123

[22] Filed: Apr. 14, 1997

[30] Foreign Application Priority Data

Jun. 10, 1996 [JP] Japan .................................... 8-147728
Apr. 9, 1997 [JP] Japan .................................... 9-090822

[51] Int. Cl.$^6$ ............................ G06K 9/74; B42D 15/00; G01N 21/00

[52] U.S. Cl. .............................. 356/71; 356/73; 356/326; 356/416; 250/559.4; 250/559.44; 283/85; 283/91

[58] Field of Search ................................ 356/71, 73, 326, 356/416; 250/559.4, 559.44; 283/85, 87, 91; 235/454, 457

[56] References Cited

U.S. PATENT DOCUMENTS 3,858,977 1/1975 Baird et al. .
4,526,466 7/1985 Sandercock .
4,832,445 5/1989 Haines et al. .
5,248,544 9/1993 Kaule .
5,304,813 4/1994 De Man .

FOREIGN PATENT DOCUMENTS 4-164749 6/1992 Japan .

*Primary Examiner*—Frank G. Font
*Assistant Examiner*—Jason D. Vierra-Eisenberg
*Attorney, Agent, or Firm*—Frishauf, Holtz, Goodman, Langer & Chick, P.C.

[57] ABSTRACT

Apparatus for discriminating bills includes a sensitive color plate provided on one side of a bill transport passage for transporting bills therethrough, and a light source for emitting light toward the sensitive color plate. A reflecting plate is provided parallel to the sensitive color plate on the other side of the bill transport passage for reflecting light from the light source transmitted through the sensitive color plate back toward the sensitive color plate. A band-pass filter passes light having a prescribed wavelength range and cuts light having other wavelengths. A photosensor detects the light reflected by the reflecting plate and transmitted through the sensitive color plate and the band-pass filter. With this arrangement, it is possible to discriminate bills having a transparent portion with high accuracy.

6 Claims, 4 Drawing Sheets

APPARATUS FOR DISCRIMINATING BILLS WHICH HAVE A TRANSPARENT PORTION

BACKGROUND OF THE INVENTION

The present invention relates to a bill discriminating apparatus and, in particular, to a compact bill discriminating apparatus for discriminating bills having a transparent portion in a part thereof with high accuracy.

DESCRIPTION OF THE PRIOR ART

Recently, bills having a hologram sandwiched by transparent sheets have been issued for preventing bill counterfeiting.

Such bills can be discriminated by detecting the thickness of the transparent sheets sandwiching the hologram. However, in the case where the thickness of the transparent sheets is detected using an optical interference method, since the optical system therefor is not only costly but also bulky, the bill discriminating apparatus inevitably becomes large and, therefore, the bill handling machine provided with the bill discriminating apparatus becomes large.

SUMMARY OF THE INVENTION

It is therefore an object of the present invention to provide a compact bill discriminating apparatus capable of discriminating bills having a transparent portion in a part thereof with high accuracy.

The above and other objects of the present invention can be accomplished by a bill discriminating apparatus comprising a sensitive color plate provided along a bill transport passage for transporting bills therein, a light source for emitting light toward the sensitive color plate, a reflecting member provided parallel to the sensitive color plate along the bill transport passage on an opposite side from the sensitive color plate for reflecting the light transmitted through the sensitive color plate toward the sensitive color plate, and light detecting means for detecting the light reflected by the reflecting member and transmitted through the sensitive color plate.

The above and other objects of the present invention can be also accomplished by a bill discriminating apparatus comprising a first sensitive color plate provided along a bill transport passage for transporting bills therein, a light source for emitting light toward the sensitive color plate, a second sensitive color plate provided along the bill transport passage on an opposite side from the first sensitive dolor plate, and light detecting means for detecting the light reflected by the reflecting member and transmitted through the sensitive color plate.

In a preferred aspect of the present invention, the light detecting means is constituted by a spectrometer.

In another preferred aspect of the present invention, the light detecting means includes a band-pass filter for selectively transmitting a predetermined wavelength of light.

The above and other objects and features of the present invention will become apparent from the following description made with reference to the accompanying drawings.

DESCRIPTION OF THE PREFERRED EMBODIMENTS

Figure 1:
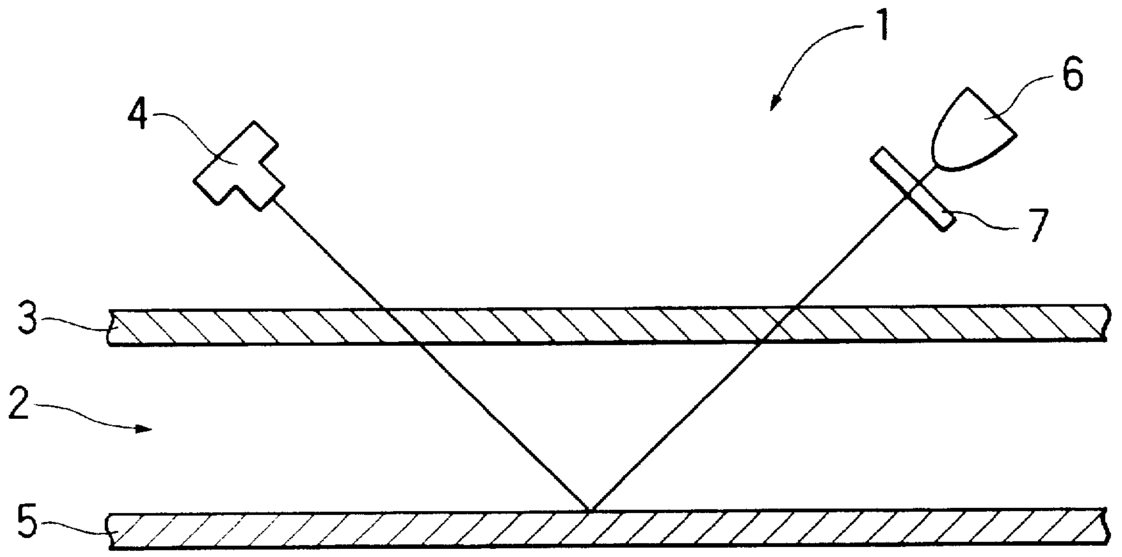
FIG. 1 is a schematic front view of a bill discriminating section of a bill discriminating apparatus which is an embodiment of the present invention.

As shown in FIG. 1, a bill discriminating apparatus 1 includes a sensitive color plate 3 provided above a bill transport passage 2 in which bills B are to be transported and in parallel to the transport surface of the bill transport passage 2, a light source 4 for emitting light toward the sensitive color plate 3, a reflecting plate 5 provided in parallel to the transport surface of the bill transport passage 2 and the sensitive color plate 3, a photosensor 6 provided on the side of the light source 4 with respect to the bill transport passage 2, and a band-pass filter 7 provided in front of the photosensor 6.

The sensitive color plate 3 is a crystal plate having optical anisotropy and has a property of dividing incident white light into two refracted lights by double refraction. In this embodiment, since a uniaxial crystal sensitive color plate 3 is employed, one of the refracted lights is an ordinary ray whose speed does not change depending on its propagation direction, the vibration direction of the dielectric displacement of which is perpendicular to a principal plane and to which the law of reflection can be applied, and the other is an extraordinary ray whose speed changes depending on its propagation direction, the vibration direction of the dielectric displacement of which is in the principal plane and to which the law of reflection cannot be applied.

Figure 2:
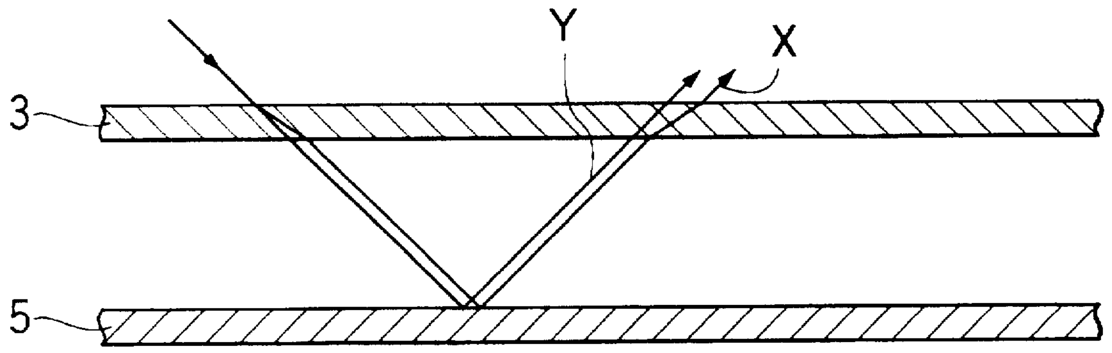
FIG. 2 is a schematic cross sectional view showing an optical path of light emitted from a light source and impinging on the sensitive color plate when no bill is present in a discriminating section.

FIG. 2 is a schematic cross sectional view showing an optical path of light emitted from the light source 4 toward the sensitive color plate 3 and impinging on the sensitive color plate 3 when no bill B is present in the discriminating section of bills B.

As shown in FIG. 2, light emitted from the light source 4 and incident on the sensitive color plate 3 is doubly refracted by the sensitive color plate 3 and divided into the ordinary ray X and the extraordinary ray Y. At this time, optical path difference arises between the ordinary ray X and the extraordinary ray Y. The ordinary ray X and the extraordinary ray Y are further reflected by the reflecting plate 5 provided below the bill transport passage 2 and in parallel to the transport surface of the bill transport passage 2 and the sensitive color plate 3 and again impinge on the sensitive color plate 3. Because of the optical path difference between the ordinary ray X and the extraordinary ray Y, these rays interfere with each other when they are being transmitted through the sensitive color plate 3 and the light transmitted through the sensitive color plate 3 is colored in accordance with the optical path difference.

Figure 3:
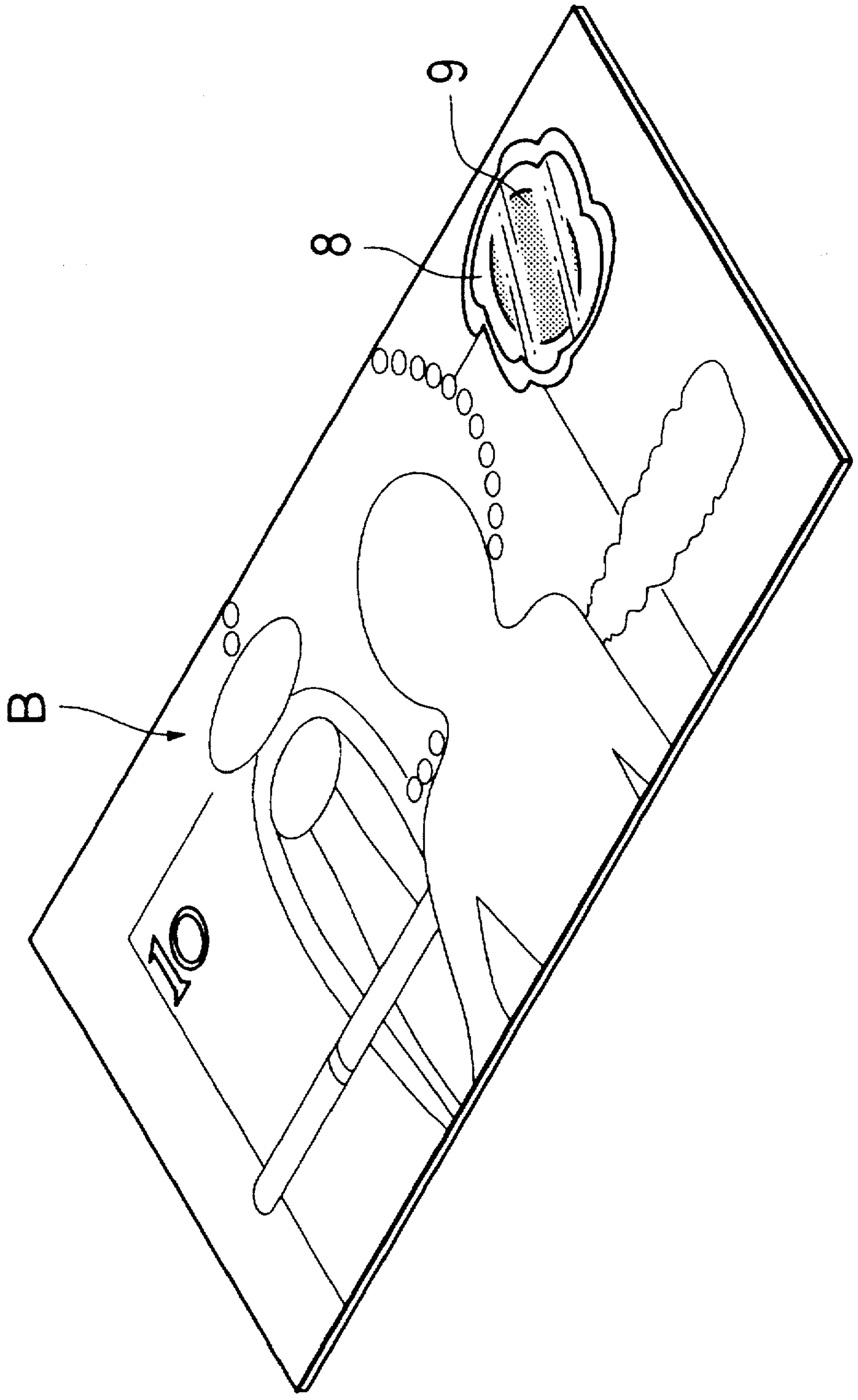
FIG. 3 is a schematic perspective view of a bill to be discriminated by a bill discriminating apparatus which is an embodiment of the present invention.

FIG. 3 is a schematic perspective view of a bill B to be discriminated by the bill discriminating apparatus 1 which is an embodiment of the present invention. As shown in FIG. 3, the bill B is formed with a hologram 9 sandwiched by transparent sheets 8 for preventing bill counterfeiting.

Figure 4:
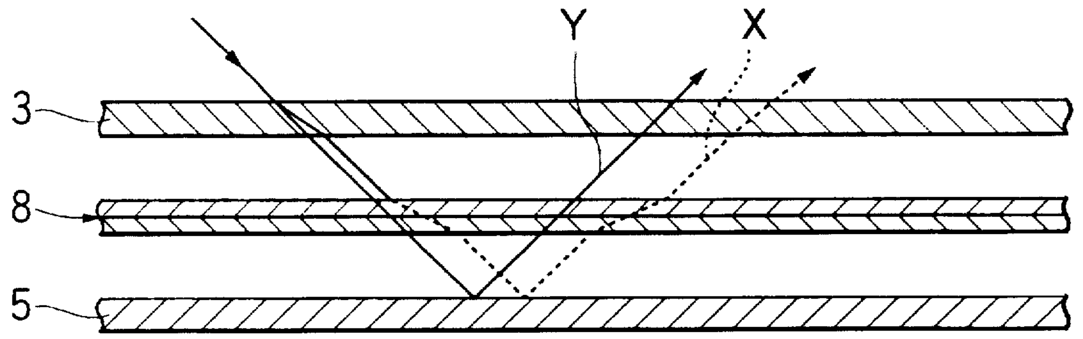
FIG. 4 is a schematic cross sectional view showing an optical path of light emitted from a light source, impinging on the sensitive color plate, doubly refracted by the sensitive color plate, transmitted through transparent sheets formed in a bill, reflected by a reflecting plate and again passing through the transparent sheets and further impinging on the sensitive color plate.

FIG. 4 is a schematic cross sectional view showing an optical path of light emitted from the light source 4, impinging on the sensitive color plate 3, doubly refracted by the sensitive color plate 3, transmitted through the transparent sheets 8 formed in the bill B, reflected by the reflecting plate 5, again transmitted through the transparent sheets 8 and further impinging on the sensitive color plate 3.

As apparent from FIGS. 2 and 4, the optical path differences between the ordinary ray X and the extraordinary ray Y generated by double refraction by the sensitive color plate 3 and again impinging on the sensitive color plate 3 are different between the case where light transmitted through the sensitive color plate 3 is reflected by the reflecting plate 5 without being transmitted through transparent sheets 8 of a bill B and again impinges on the sensitive color plate 3, and the case where light transmitted through the sensitive color plate 3 passes through the transparent sheets 8 of the bill B, is reflected by the reflecting plate 5, is again transmitted through the transparent sheets 8 of the bill B and further impinges on the sensitive color plate 3. As a result, the color of the light which has been again transmitted through the sensitive color plate 3 is different between the case where the light has not been transmitted through transparent sheets 8 of a bill B and the case where the light has been transmitted through the transparent sheets 8 of the bill B. Further, even if light is twice transmitted through the transparent sheets 8 of bills B, the color of the light transmitted through the sensitive color plate 3 is different, if the thickness of the transparent sheets 8 of bills B is different. Moreover, if no transparent sheet 8 is formed in a bill B, since the ordinary ray X and the extraordinary ray Y generated by double refraction by the sensitive color plate 3 are reflected by the surface of a bill B and impinge on the sensitive color plate 3, the color of the light transmitted through the sensitive color plate 3 is different from that of light transmitted through the transparent sheets 8. The bill discriminating apparatus 1 according to the present invention discriminates bills B by utilizing this phenomenon, namely, that the color (wavelength) of light transmitted through the sensitive color plate 3 is different depending on optical path difference between the ordinary ray X and the extraordinary ray Y.

In this embodiment, the band-pass filter 7 disposed in front of the photosensor 6 is constituted so as to transmit light twice passing through the transparent sheets 8 of a genuine bill B and the sensitive color plate 3, partly transmit but partly cut light reflected by the reflecting plate 5 and transmitted through the sensitive color plate 3 without being transmitted through the transparent sheets, and cut other incident light transmitted through the sensitive color plate 3. More specifically, when light transmitted through the transparent sheets 8 provided in a genuine bill B, reflected by the reflecting plate 5 and again transmitted through the transparent sheets 8 is transmitted through the sensitive color plate 3, the light is colored in accordance with the thickness of the transparent sheets 8. The band-pass filter 7 allows the light having this color, namely, wavelength, corresponding to this color, to pass through. When no bill B is present and light reflected by the reflecting plate 5 without being transmitted through transparent sheets 8 is transmitted through the sensitive color plate 3, the light is colored in accordance with the distance between the sensitive color plate 3 and the reflecting plate 5. The band-pass filter 7 partly transmits but partly cuts light having this color, namely, wavelength, corresponding to this color. When light transmitted through the sensitive color plate 3 and reflected by the surface of a bill B formed with no hologram 9 sandwiched by transparent sheets 8 is transmitted through the sensitive color plate 3, thereby being colored, or when light transmitted through transparent sheets 8 whose thickness is different from that of the transparent sheets 8 formed in a genuine bill B, reflected by the reflecting plate 5 and again passing through the transparent sheets 8 is transmitted through the sensitive color plate 3, the band-pass filter 7 does not transmit but cuts the light. Therefore, since light again transmitted through the sensitive color plate 3, colored and falling incident on the band-pass filter 7, passes through the band-pass filter 7, or is partly or completely cut by the band-pass filter 7 in accordance with the wavelengths, it is possible to discriminate bills B depending on the amount of light received by the photosensor 6.

Figure 5:
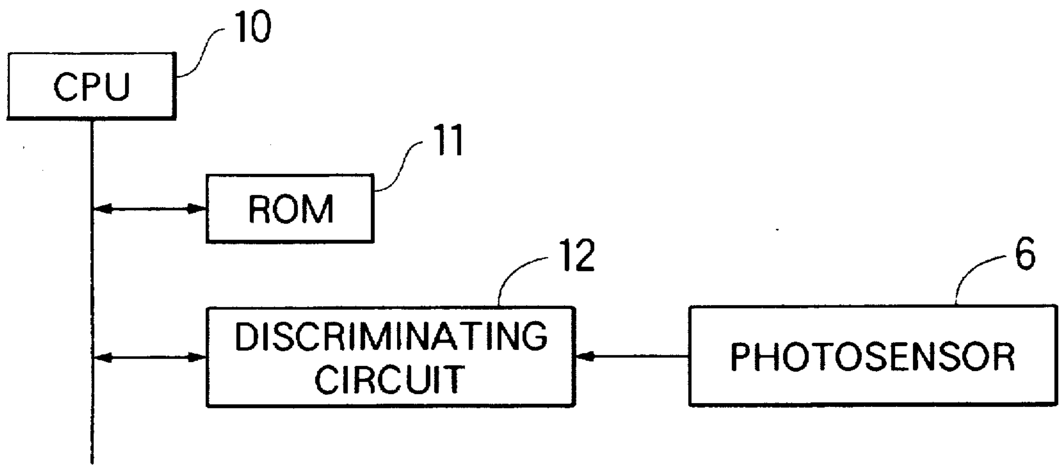
FIG. 5 is a block diagram of detection and discrimination systems of a bill discriminating apparatus which is an embodiment of the present invention.

FIG. 5 is a block diagram of detection and discrimination systems of the bill discriminating apparatus 1 which is an embodiment of the present invention.

As shown in FIG. 5, the detection system of the bill discriminating apparatus 1 includes the photosensor 6 for detecting light again transmitted through the sensitive color plate 3 and transmitted through the band-pass filter 7. The discrimination system of the bill discriminating apparatus 1 includes a CPU 10 for controlling the overall operation of the bill discriminating apparatus 1, ROM 11 for storing control programs, reference data and the like, and a discriminating circuit 12 for discriminating bills B in accordance with detection signals from the photosensor 6. The ROM 11 stores a first threshold value T1 and a second threshold value T2. The first threshold value T1 is determined to be lower than the amount of light transmitted through the sensitive color plate 3, reflected by the reflecting plate 5 without being transmitted through transparent sheets 8, colored by again passing through the sensitive color plate 3 and detected by the photosensor 6 via the band-pass filter 7. The second threshold value T2 is determined to be higher than the amount of light transmitted through the sensitive color plate 3, reflected by the reflecting plate 5 without being transmitted through transparent sheets 8, colored by again passing through the sensitive color plate 3 and detected by the photo-sensor 6 via the band-pass filter 7 and lower than the amount of light transmitted through the transparent sheets 8 formed in a genuine bill B, again transmitted through the sensitive color plate 3 and detected by the photosensor 6 via the band-pass filter 7. Therefore, by comparing the first threshold value T1 and the second threshold value T2 read out from the ROM 11 with the amount of light detected by the photosensor 6, the discriminating circuit 12 can discriminate that no bill B is present when the amount of light detected by the photosensor 6 exceeds the first threshold value T1 but is lower than the second threshold value T2, discriminate that the bill B is genuine when the amount of light detected by the photosensor 6 exceeds the second threshold value T2, and discriminate that the bill B is a counterfeit or foreign bill or that two or more bills B are transported partly or completely overlapped when the amount of light detected by the photosensor 6 is lower than the first threshold value.

The thus constituted bill discriminating apparatus 1 discriminates bills B in the following manner.

In the case where no bill B is present, as shown in FIG. 2, white light emitted from the light source 4 enters the sensitive color plate 3 and is doubly refracted to be divided into an ordinary ray X and an extraordinary ray Y. The ordinary ray X and the extraordinary ray Y are reflected by the reflecting plate 5 disposed below the bill transport passage 2 and in parallel to the sensitive color plate 3. The light reflected by the reflecting plate 5 again enters the sensitive color plate 3 and passes therethrough, thereby being colored in accordance with the optical path difference between the ordinary ray X and the extraordinary ray Y and impinges on the band-pass filter 7. Since the band-pass filter 7 is constituted so as to partly transmit but partly cut the wavelength of light again transmitted through the sensitive color plate 3 and colored without being transmitted through transparent sheets, a part of the light transmitted through the sensitive color plate 3 is detected by the photosensor 6. When a detection signal is input from the photosensor 6, the discriminating circuit 12 reads out the first threshold value T1 and the second threshold value T2 and compares them with the amount of light detected by the photosensor 6. As described above, the first threshold value T1 is determined to be lower than the amount of light transmitted through the sensitive color plate 3, reflected by the reflecting plate 5 without being transmitted through transparent sheets 8, colored by again passing through the sensitive color plate 3 and detected by the photo-sensor 6 via the band-pass filter 7, and the second threshold value T2 is determined to be higher than the amount of light transmitted through the sensitive color plate 3, reflected by the reflecting plate 5 without being transmitted through transparent sheets 8, colored by again passing through the sensitive color plate 3 and detected by the photo-sensor 6 via the band-pass filter 7 and lower than the amount of light transmitted through the transparent sheets 8 formed in a genuine bill B, again transmitted through the sensitive color plate 3 and detected by the photosensor 6 via the band-pass filter 7. In this case, therefore, since the amount of light detected by the photosensor 6 exceeds the first threshold value T1 and is lower than the second threshold value T2, the discriminating circuit 12 discriminates that no bill B is present.

When the transparent sheets 8 sandwiching the hologram 9 formed in a genuine bill B reach the bill discriminating section, as shown in FIG. 4, white light emitted from the light source 4, impinging on the sensitive color plate 3, doubly refracted by the sensitive color plate 3 to be divided into an ordinary ray X and an extraordinary ray Y passes through the transparent sheets 8 and is reflected by the reflecting plate 5. The ordinary ray X and the extraordinary ray Y reflected by the reflecting plate 5 again pass through the transparent sheets 8 and enter the sensitive color plate 3, thereby being colored, and impinge on the band-pass filter 7. As described above, the band-pass filter 7 is constituted so as to transmit the wavelength of light transmitted through the transparent sheets 8 provided in a genuine bill B and again transmitted through the sensitive color plate 3, thereby being colored. The light twice transmitted through the transparent sheets 8 of the bill B is therefore received by the photosensor 6. When a detection signal is input from the photosensor 6, the discriminating circuit 12 reads out the first threshold value T1 and the second threshold value T2 and compares them with the amount of light detected by the photosensor 6. As described above, the first threshold value T1 is determined to be lower than the amount of light transmitted through the sensitive color plate 3, reflected by the reflecting plate 5 without being transmitted through transparent sheets 8, colored by again passing through the sensitive color plate 3 and detected by the photo-sensor 6 via the band-pass filter 7, and the second threshold value T2 is determined to be higher than the amount of light transmitted through the sensitive color plate 3, reflected by the reflecting plate 5 without being transmitted through transparent sheets 8, colored by again passing through the sensitive color plate 3 and detected by the photo-sensor 6 via the band-pass filter 7 and lower than the amount of light transmitted through the transparent sheets 8 formed in a genuine bill B, again transmitted through the sensitive color plate 3 and detected by the photosensor 6 via the band-pass filter 7. In this case, therefore, since the amount of light detected by the photosensor 6 exceeds the second threshold value T2, the discriminating circuit 12 discriminates that the genuine bill B is detected.

To the contrary, in the case where a counterfeit or foreign bill B formed with no hologram 9 sandwiched by transparent sheets 8 is transported or two or more partly overlapped bills B are transported to the bill discriminating section, light emitted from the light source 4 and transmitted through the sensitive color plate 3 is reflected by the surface of bill B and again passes through the sensitive color plate 3, thereby being colored. Although the colored light impinges on the band-pass filter 7, since it is cut by the band-pass filter 7, the photosensor does not receive any light or even if it receives some light, the amount of light detected by the photosensor 6 is lower than the first threshold value T1. Therefore, the discriminating circuit 12 discriminates that an ungenuine bill B is detected or that two or more bills B are being transported as partly overlapped.

Further, in the case where an ungenuine bill B such as a counterfeit bill, a foreign bill or the like formed with a hologram 9 sandwiched by transparent sheets 9 is transported or two or more bills are transported as completely overlapped, light emitted from the light source 4 and transmitted through the sensitive color plate 3 can pass through the transparent sheets 8 of the bill B and be reflected by the reflecting plate 5. The light reflected by the reflecting plate 5 again passes through the transparent sheets 8 and the sensitive color plate 3, thereby being colored, and impinges on the band-pass filter 7. However, unless the thickness of the transparent sheets 8 is equal to that of a genuine bill B, the optical path difference between the ordinary ray X and the extraordinary ray Y is different from that generated by light twice passing through the transparent sheets 8 of the genuine bill B. As a result, the wavelength of the light transmitted through the sensitive color plate 3 is different from that of light transmitted through the transparent sheets 8 of a genuine bill B. Therefore, the light is cut by the band-pass filter 7 and the photosensor 6 does not receive any light or even if it receives some light, the amount of light detected by the photosensor 6 is lower than the first threshold value T1. Therefore, the discriminating circuit 12 discriminates that an ungenuine bill B is detected or that two or more bills B are being transported as completely overlapped.

According to the above described embodiment, bills B are discriminated only using the sensitive color plate 3 by detecting whether transparent sheets 8 having prescribed thickness are provided in bills B. Therefore, it is possible to remarkedly reduce the size of the bill discriminating apparatus 1 as compared with that of a bill discriminating apparatus for detecting the thickness of transparent sheets using an optical interference method. Further, since the sensitive color plate 3 can greatly change the color of light transmitted through the sensitive color plate 3 depending on optical path difference between an ordinary ray X and an extraordinary ray Y, bills B can be accurately discriminated.

Figure 6:
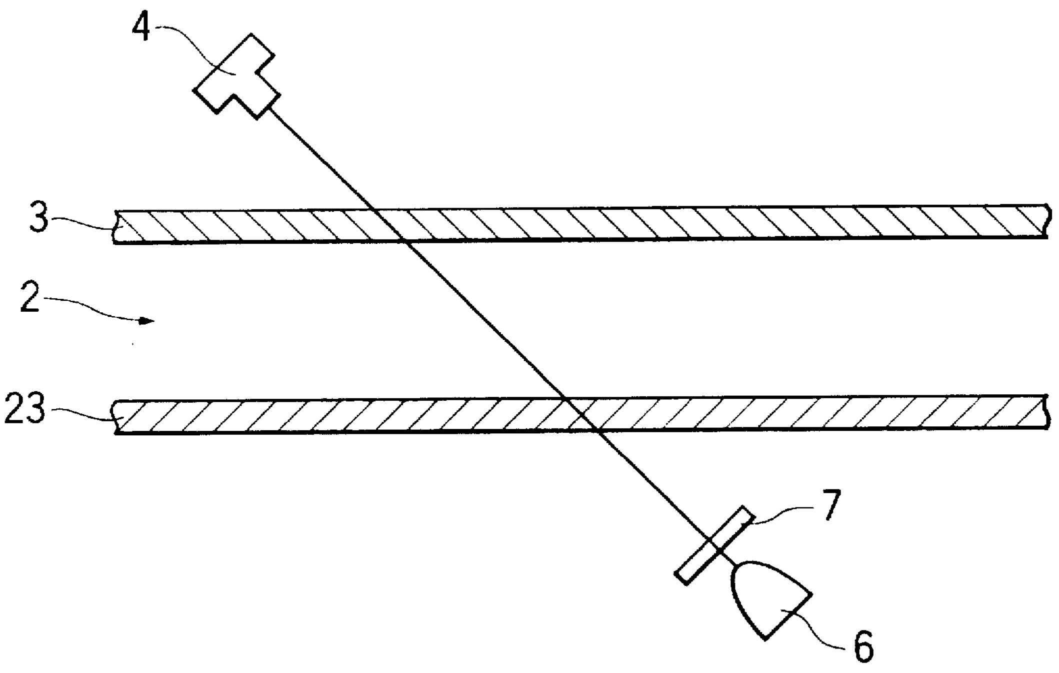
FIG. 6 is a schematic front view of a bill discriminating section of a bill discriminating apparatus which is another embodiment of the present invention.

FIG. 6 is a schematic front view of the discriminating section of a bill discriminating apparatus which is another embodiment of the present invention.

As shown in FIG. 6, the bill discriminating apparatus 1 according to this embodiment is provided with a second sensitive color plate 23 instead of the reflecting plate 5, and the band-pass filter 7 and the photosensor 8 are disposed on the opposite side to the light source 4 with respect to the bill transport passage 2.

In this embodiment, the band-pass filter 7 provided in front of the photosensor 6 is constituted so as to partly transmit the wavelength of light emitted from the light source 4, divided into an ordinary ray X and an extraordinary ray Y by passing through the sensitive color plate 3 and colored by passing through the second sensitive color plate 23 but to partly cut it. The band-pass filter 7 is also constituted so as to transmit the wavelength of light emitted from the light source 4, divided into an ordinary ray X and an extraordinary ray Y by passing through the sensitive color plate 3, passing through the transparent sheets 8 of a genuine bill B and colored by passing through the second sensitive color plate 23 but to cut other wavelengths of light. Further, the first threshold value T1 stored in the ROM 11 is determined to be lower than the amount of light emitted from the light source 4, passing through the sensitive color plate 3 to be divided into an ordinary ray X and an extraordinary ray Y, passing through the second sensitive color plate 23 without being transmitted through transparent sheets of the bill B, colored and detected by the photosensor 6 via the band-pass filter 7. The second threshold value T2 is determined to be higher than the amount of light emitted from the light source 4, passing through the sensitive color plate 3 to be divided into an ordinary ray X and an extraordinary ray Y, passing through the second sensitive color plate 23 without being transmitted through transparent sheets of the bill B, colored and detected by the photosensor 6 via the band-pass filter 7 and lower than the amount of light emitted from the light source 4, passing through the sensitive color plate 3 to be divided into an ordinary ray X and an extraordinary ray Y, passing through the transparent sheets 8 formed in a genuine bill B, passing through the second sensitive color plate 3, colored and detected by the photosensor 6 via the band-pass filter 7.

Therefore, according to this embodiment, similarly to the above described embodiment shown in FIGS. 1 to 5, the discriminating circuit 12 can discriminate bills B by comparing the amount of light detected by the photosensor 6 with the first threshold value T1 and the second threshold value T2 based on a detection signal input from the photosensor 6.

Figure 7:
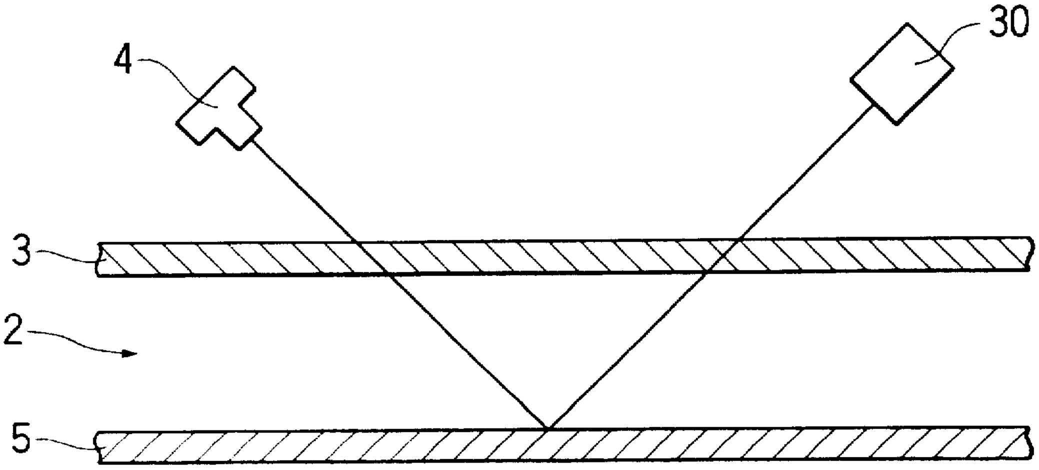
FIG. 7 is a schematic front view of a bill discriminating section of a bill discriminating apparatus which is a further embodiment of the present invention.

FIG. 7 is a schematic front view of the discriminating section of a bill discriminating apparatus which is a further embodiment of the present invention.

As shown in FIG. 7, the bill discriminating apparatus 1 according to this embodiment is different from that shown in FIGS. 1 to 5 in that it is provided with a spectrometer 30 instead of the photosensor 6 but is not provided with the band-pass filter 7. Further, the ROM 11 stores reference data experimentally determined in advance indicating the relationship between the thickness of transparent sheets 8 and the wavelength of light transmitted through the transparent sheets 8 and the sensitive color plate 3, colored and detected by the spectrometer 30, the wavelength of light transmitted through the sensitive color plate 3 without being transmitted through a transparent sheet, colored and detected by the spectrometer 30 and the wavelength of light reflected by the bill B, transmitted through the sensitive color plate 3. The discriminating circuit 12 is constituted so as to read out the reference data stored in the ROM 11 in accordance with the wavelength of light detected by the spectrometer 30 and discriminate bills B by judging whether or not a bill B is present, whether or not transparent sheets 8 are provided in a bill B, the thickness of a bill B, and whether or not two or more bills are being transported as partly or completely overlapped.

According to this embodiment, bills B can be discriminated by detecting the wavelengths of light again transmitted through the sensitive color plate 3 and determining the thickness of transparent sheets 8 provided in bills B and, it is therefore possible to more accurately discriminate bills B.

The present invention has thus been shown and described with reference to specific embodiments. However, it should be noted that the present invention is in no way limited to the details of the described arrangements but changes and modifications may be made without departing from the scope of the appended claims.

For example, in the above described embodiment shown in FIGS. 1 to 5, the first threshold value T1 and the second threshold value T2 are stored in the ROM 11 and the presence and genuineness of bills B are discriminated. However, it is possible to store in the ROM 11 a single threshold value T determined to be lower than the amount of light transmitted through the sensitive color plate 3, reflected by the reflecting plate 5 without being transmitted through transparent sheets 8, colored by again passing through the sensitive color plate 3 and detected by the photosensor 6 via the band-pass filter 7, discriminate that no bill B is present when an amount of light higher than the threshold value T has been detected for a time period longer than a prescribed time period and discriminate that a genuine bill B is detected when an amount of light higher than the threshold value T has been detected for a time period shorter than the prescribed time period.

Further, in the above described embodiment shown in FIG. 7, although the spectrometer 30 is disposed on the side of the light source 4 with respect to the bill transport passage 2, it is possible to provide a second sensitive color plate 23 similarly to the embodiment shown in FIG. 6 and dispose the spectrometer 30 on the opposite side to the light source 4 with respect to the bill transport passage 2.

Furthermore, in this specification and the appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide a compact bill discriminating apparatus capable of discriminating bills having a transparent portion in a part thereof with high accuracy.

I claim:

1. A bill discriminating apparatus comprising a sensitive color plate provided along one side of a bill transport passage for transporting bills therethrough, a light source for emitting light toward the sensitive color plate, a reflecting member provided parallel to the sensitive color plate along an opposite side of the bill transport passage from the sensitive color plate for reflecting light from said light source transmitted through the sensitive color plate back toward the sensitive color plate, light detecting means for detecting the light reflected by the reflecting member and transmitted back through the sensitive color plate, and discriminating means for discriminating a bill which is in the bill transport passage based on the amount of light detected by the light detecting means.

2. A bill discriminating apparatus in accordance with claim 1 wherein the light detecting means is constituted by a spectrometer.

3. A bill discriminating apparatus in accordance with claim 1 wherein the light detecting means includes a band-pass filter for selectively transmitting a predetermined wave-length of light.

4. A bill discriminating apparatus comprising a first sensitive color plate provided along one side of a bill transport passage for transporting bills therethrough, a light source for emitting light toward the first sensitive color plate, a second sensitive color plate provided along an opposite side of the bill transport passage from the first sensitive color plate, light detecting means for detecting light from said light source transmitted through the second sensitive color plate, and discriminating means for discriminating a bill which is in the bill transport passage based on the amount of light detected by the light detecting means.

5. A bill discriminating apparatus in accordance with claim 4 wherein the light detecting means is constituted by a spectrometer.

6. A bill discriminating apparatus in accordance with claim 4 wherein the light detecting means includes a band-pass filter for selectively transmitting a predetermined wave-length of light.

* * * * *